US008796976B2

(12) United States Patent
Kusakawa

(10) Patent No.: US 8,796,976 B2
(45) Date of Patent: Aug. 5, 2014

(54) ELECTRIC POWER TOOL

(71) Applicant: Takuya Kusakawa, Anjo (JP)

(72) Inventor: Takuya Kusakawa, Anjo (JP)

(73) Assignee: Makita Corporation, Anjo-shi (JP)

( * ) Notice: Subject to any disclaimer, the term of this patent is extended or adjusted under 35 U.S.C. 154(b) by 149 days.

(21) Appl. No.: 13/628,812

(22) Filed: Sep. 27, 2012

(65) Prior Publication Data

US 2013/0082632 A1 Apr. 4, 2013

(30) Foreign Application Priority Data

Sep. 30, 2011 (JP) ................................ 2011-217603

(51) Int. Cl.
*G05D 17/02* (2006.01)

(52) U.S. Cl.
USPC ........... 318/477; 318/430; 318/432; 318/434; 318/280; 388/937

(58) Field of Classification Search
USPC ........... 318/280, 430, 432, 434, 477; 388/937
See application file for complete search history.

(56) References Cited

U.S. PATENT DOCUMENTS 4,906,980 A * 3/1990 Fukuhara ...................... 340/680
5,404,643 A * 4/1995 Rice ........................... 29/898.09
5,440,215 A * 8/1995 Gilmore ........................ 318/432
5,493,913 A * 2/1996 Layer et al. ...................... 73/761
5,563,482 A * 10/1996 Shaw et al. .................... 318/272
5,591,919 A * 1/1997 Hathaway et al. .............. 73/761
5,731,673 A * 3/1998 Gilmore ........................ 318/432
5,754,019 A * 5/1998 Walz ............................ 318/434
5,890,405 A * 4/1999 Becker ........................... 81/434
6,424,112 B1 * 7/2002 Schauer ........................ 318/599
6,424,799 B1 * 7/2002 Gilmore ........................ 388/811
6,479,958 B1 * 11/2002 Thompson et al. ........... 318/430
6,536,536 B1 * 3/2003 Gass et al. ........................ 173/2
6,553,321 B2 * 4/2003 Siegel et al. .................... 702/33
6,571,179 B2 * 5/2003 Siegel ............................ 702/33
6,607,041 B2 * 8/2003 Suzuki et al. ..................... 173/4
6,629,055 B2 * 9/2003 McGee et al. ................ 702/151
6,687,567 B2 * 2/2004 Watanabe ..................... 700/168
6,836,614 B2 * 12/2004 Gilmore ........................ 388/811
7,036,605 B2 * 5/2006 Suzuki et al. ................... 173/20
7,091,683 B1 * 8/2006 Smith et al. ................... 318/432
7,239,097 B2 * 7/2007 Hashimoto .............. 318/400.08
7,405,530 B2 * 7/2008 Keller, Jr. ...................... 318/466
7,521,892 B2 4/2009 Funabashi et al.

(Continued)

FOREIGN PATENT DOCUMENTS

JP A-2006-281404 10/2006
JP A-2010-214564 9/2010

*Primary Examiner* — Paul Ip
(74) *Attorney, Agent, or Firm* — Oliff PLC

(57) ABSTRACT

An electric power tool includes a motor that rotary drives an output shaft; an operation unit to input a drive command of the motor; a torque setting device that sets an upper limit value of a rotational torque of the output shaft in accordance with a torque setting command; and a control device that drives the motor in one of a forward direction and a reverse direction in accordance with the drive command, and stops driving of the motor when the rotational torque of the output shaft has reached the upper limit value set by the torque setting device during driving of the motor. The torque setting device is configured to set the upper limit value such that the upper limit value during driving of the motor in the forward direction and the upper limit value during driving of the motor in the reverse direction are different.

11 Claims, 8 Drawing Sheets

(56) References Cited

U.S. PATENT DOCUMENTS

| | | | | |
|---|---|---|---|---|
| 7,896,098 | B2 * | 3/2011 | Suzuki et al. | 173/112 |
| 8,210,275 | B2 * | 7/2012 | Suzuki et al. | 173/112 |
| 8,466,641 | B2 * | 6/2013 | Kaufmann et al. | 318/379 |
| 2002/0050364 | A1 * | 5/2002 | Suzuki et al. | 173/1 |
| 2002/0153856 | A1 * | 10/2002 | Gilmore | 318/599 |
| 2003/0102837 | A1 * | 6/2003 | Keller, Jr. | 318/466 |
| 2003/0121685 | A1 * | 7/2003 | Yamamoto | 173/217 |
| 2003/0149508 | A1 * | 8/2003 | Watanabe | 700/168 |
| 2003/0173096 | A1 * | 9/2003 | Setton et al. | 173/176 |
| 2004/0144552 | A1 * | 7/2004 | Suzuki et al. | 173/2 |
| 2004/0217727 | A1 * | 11/2004 | Gilmore | 318/599 |
| 2006/0118315 | A1 * | 6/2006 | Suzuki et al. | 173/2 |
| 2007/0114956 | A1 * | 5/2007 | Hashimoto | 318/139 |
| 2010/0084150 | A1 * | 4/2010 | Suzuki et al. | 173/2 |
| 2011/0114346 | A1 * | 5/2011 | Suzuki et al. | 173/2 |

* cited by examiner

FIG.4

| TORQUE SETTING VALUE | CLUTCH THRESHOLD VALUE FOR FORWARD ROTATION | CLUTCH THRESHOLD VALUE FOR REVERSE ROTATION |
|---|---|---|
| 1 | 20 | 25 |
| 2 | 40 | 50 |
| 3 | 60 | 70 |
| 4 | 80 | 100 |
| 5 | 100 | 120 |
| 6 | 120 | 140 |
| 7 | 140 | 160 |
| 8 | 160 | 190 |
| 9 | 180 | 210 |

FIG.8

| TORQUE SETTING VALUE | CLUTCH THRESHOLD VALUE FOR FORWARD ROTATION | CLUTCH THRESHOLD VALUE FOR REVERSE ROTATION |
|---|---|---|
| 1 | 20 | 19 |
| 2 | 40 | 38 |
| 3 | 60 | 57 |
| 4 | 80 | 76 |
| 5 | 100 | 95 |
| 6 | 120 | 114 |
| 7 | 140 | 133 |
| 8 | 160 | 152 |
| 9 | 180 | 171 |

ELECTRIC POWER TOOL

CROSS-REFERENCE TO RELATED APPLICATIONS

This application claims the benefit of Japanese Patent Application No. 2011-217603 filed Sep. 30, 2011 in the Japan Patent Office, the disclosure of which is incorporated herein by reference.

BACKGROUND

The present invention relates to an electric power tool which is rotary driven by a motor.

A so-called electronic clutch-type electric power tool has been known as disclosed in Japanese Unexamined Patent Application Publication No. 2006-281404 and Japanese Unexamined Patent Application Publication No. 2010-214564. An electric power tool of this type is configured such that driving of the motor is stopped when a rotational torque of an output shaft on which a tool element, such as a driver bit, is mounted exceeds a predetermined upper limit value (hereinafter, also referred to as a “set torque”).

The electric power tool of this type is configured such that the motor can be driven both in a forward direction and a reverse direction in order to allow tightening and removal of, for example, a screw. By controlling driving of the motor such that the rotational torque of the output shaft does not exceed the set torque regardless of a rotation direction of the motor, a function as an electronic clutch can be achieved.

SUMMARY

When a screw is tightened with a given tightening torque, it is usually possible to loosen the tightening of the screw with a smaller torque than the tightening torque. However, in some cases such as a case where impurities are caught by the screw, it is required to rotate the output shaft with a larger torque than the tightening torque in order to loosen the tightening of the screw.

In the above conventional electric power tool, the set torque is set in a uniform manner regardless of the rotation direction of the motor. Accordingly, in a case of tightening a screw by forwardly rotating the motor and thereafter removing the screw by reversely rotating the motor, it is required to change the set torque.

Specifically, there is a problem that in the case of tightening a screw and thereafter loosening the tightening of the screw, a user is required in some cases to change the set torque to a different value from the set torque during the tightening, which leads to a poor usability.

It is desirable that, in an electronic clutch-type electric power tool, an upper limit of a rotational torque in a case of tightening and removing an object by forwardly and reversely rotating a motor can be appropriately set by a simple setting operation.

In an electric power tool of a first aspect of the present invention, when a drive command of a motor is inputted by an operation unit, a control device drives the motor in a forward direction or a reverse direction in accordance with the drive command to thereby rotary drive an output shaft on which a tool element is mounted.

The control device stops driving of the motor when a rotational torque of the output shaft has reached an upper limit value set by a torque setting device during driving of the motor, thereby serving the aforementioned function as an electronic clutch.

The torque setting device sets the upper limit value of the rotational torque of the output shaft such that the upper limit value during driving of the motor in the forward direction and the upper limit value during driving of the motor in the reverse direction are different, in accordance with a torque setting command inputted externally.

According to the electric power tool of the present invention, therefore, by setting the upper limit value to be set by the torque setting device appropriately for each rotation direction of the motor, it is possible for a user to drive the tool element with an appropriate torque without newly setting the upper limit value of the rotational torque each time of switching the rotation direction of the motor. Thus, it is possible to attain an improved usability for the user according to the electric power tool of the present invention.

In a case where the electric power tool of the present invention is configured to tighten an object through the tool element by a rotation of the motor in the forward direction and loosen an object through the tool element by a rotation of the motor in the reverse direction, the present invention may be configured as described below.

In an electric power tool of a second aspect of the present invention, the torque setting device sets the upper limit value of the rotational torque of the output shaft such that the upper limit value is larger during driving of the motor in the reverse direction than during driving of the motor in the forward direction.

According to the electric power tool of the second aspect of the present invention, therefore, in a case of once tightening an object, such as a screw, a bolt, or the like, and thereafter loosening the tightening and removing the object, it is possible to make a driving torque of the tool element larger than during the tightening. Thus, a user may remove the object in a favorable manner according to the electric power tool.

In the electric power tool of the second aspect of the present invention, the control device may be configured to inhibit drive stop control of the motor based on the upper limit value set by the torque setting device when the motor is driven in the reverse direction after the motor is driven in the forward direction, as in a third aspect of the present invention.

With the above described configuration, it is possible to temporarily stop the function as an electronic clutch when it is necessary to loosen the tightening of an object after tightening thereof, and thus a user may remove the object in a more favorable manner.

BRIEF DESCRIPTION OF THE DRAWINGS

The present invention will now be described by way of example with reference to the accompanying drawings, in which:

FIG. 4 is an explanatory view showing a threshold value setting map;

FIG. 8 is an explanatory view showing a threshold value setting map.

DETAILED DESCRIPTION OF THE PREFERRED EMBODIMENTS

In an electric power tool of a present embodiment, an output shaft on which a tool bit (for example, a driver bit) as a tool element is mounted is rotatable in both directions (forward and reverse rotation directions). This allows tightening and/or removing of an object (for example, a screw or a bolt) through the tool bit.

Figure 1:
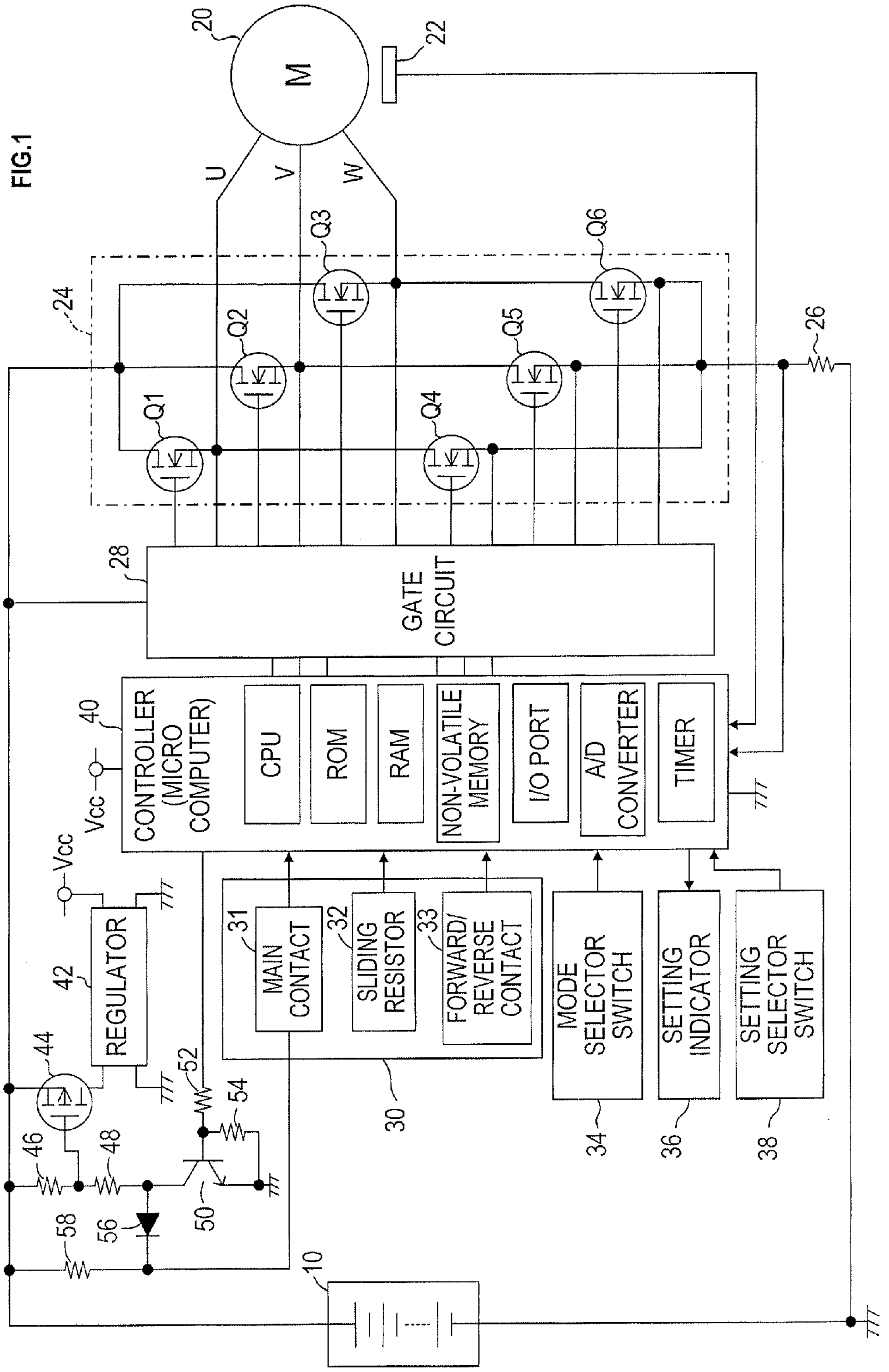
FIG. 1 is a block diagram showing an entire configuration of a drive system of an electric power tool in an embodiment of the present invention.

FIG. 1 shows an entire configuration of a drive system to rotary drive the output shaft. The drive system is contained in or mounted on a main body housing (not shown) of the electric power tool. As shown in FIG. 1, the electric power tool includes a three-phase brushless direct current motor as a motor 20 to rotary drive the output shaft. The motor 20, which is connected to the output shaft of the electric power tool through a speed changer, rotary drives the output shaft through the speed changer.

The electric power tool also includes a battery pack 10, a motor drive circuit 24, a gate circuit 28, and a controller 40 as a driving apparatus that controls driving of the motor 20.

The battery pack 10 is constituted by placing a plurality of serially connected secondary battery cells in a case configured to be attachable to and detachable from the main body housing of the electric power tool.

The motor drive circuit 24, which is a circuit to receive power supply from the battery pack 10 and supply current to a winding wire of each phase of the motor 20, includes six switching devices Q1-Q6 each constituted by an FET.

In the motor drive circuit 24, the switching devices Q1-Q3 are provided, as so-called highside switches, between respective phase terminals U, V and W of the motor 20, and a power source line connected to a positive electrode of the battery pack 10.

The switching devices Q4-Q6 are provided, as so-called lowside switches, between the respective phase terminals U, V and W of the motor 20, and a ground line connected to a negative electrode of the battery pack 10.

The gate circuit 28 is a circuit that turns on/off the switching devices Q1-Q6 in the motor drive circuit 24 in accordance with a control signal outputted from the controller 40, to thereby supply current to the winding wire of the each phase of the motor 20 and rotary drive the motor 20.

The controller 40 is constituted by a one-chip microcomputer (hereinafter, referred to as the "microcomputer") which includes a CPU, a ROM, a RAM, a non-volatile memory, an I/O port, an A/D converter, a timer, etc.

The controller 40 sets drive duty ratios of the respective switching devices Q1-Q6 constituting the motor drive circuit 24 in accordance with a drive command from the trigger switch 30, and outputs a control signal in accordance with the drive duty ratios to the gate circuit 28, to thereby rotary drive the motor 20.

The trigger switch 30, which is a switch for a user to input a drive command of the electric power by manual operation, is provided to the main body housing together with a mode selector switch 34, a setting display unit 36, and a setting selector switch 38.

The trigger switch 30 includes a main contact 31, a sliding resistor 32, and a forward/reverse contact 33. The main contact 31 is turned to an ON state when the trigger switch 30 is operated by the user. The sliding resistor 32 is configured to have a resistance value varying in accordance with a stroke amount (in other words, an amount of operation) of the trigger switch 30 by the user. The forward/reverse contact 33 is a contact to receive a rotation direction switching command from the user.

The mode selector switch 34 is a switch to switch over a setting mode to a mode for setting a torque setting value (information which may represent an upper limit value of a rotational torque of the output shaft), a mode for setting a set speed value (information which may represent an upper limit value of a rotation speed of the motor 20).

The setting selector switch 38 is a switch to set the torque setting value and the set speed value by external operation depending on the setting mode switched over by the mode selector switch 34.

These switches 34 and 38 are connected to the controller 40. The controller 40 updates the torque setting value and the set speed value in accordance with command signals inputted from the respective switches 34 and 38, and displays the updated torque setting value and set speed value on the setting display unit 36.

The motor 20 includes an encoder 22 to detect the rotation speed and a rotation direction of the motor 20. The encoder 22 is constituted by, for example, a Hall element which detects changes of magnetic flux caused by a rotation of the motor.

A resistor 26 for detecting a current (hereinafter referred as a "motor current") flowing in the motor 20 as a driving torque of the output shaft is provided in a current supply path formed from the battery pack 10 through the motor drive circuit 24 to the motor 20.

Each of a detection signal from the encoder 22 and a detection signal of the motor current from the resistor 26 is inputted into the controller 40. Since the controller 40 is constituted by the microcomputer, a certain amount of power-supply voltage Vcc needs to be supplied thereto.

Accordingly, a regulator 42 is provided in the main body housing of the electric power tool. The regulator 42 receives power supply from the battery pack 10 through the switching device 44, to thereby generate the certain amount of power-supply voltage Vcc (for example, a direct current of 5V) and supply the same to the controller 40.

The switching device 44 is constituted by an FET in which a source is connected to a positive power source line from the battery pack 10 to the motor drive circuit 24, while a drain is connected to the regulator 42.

A gate of the switching device 44 is connected to the positive power source line from the battery pack 10 to the motor drive circuit 24 through a resistor 46, and is grounded to the earth through a resistor 48 and a transistor 50.

The transistor 50 is an NPN transistor in which a collector is connected to the resistor 48, an emitter is grounded to the earth, a base is connected to the controller 40 through a resistor S2, and the emitter and the base are connected by a resistor 54. An anode of a diode 56 is connected to a connection point between the collector of the transistor 50 and the resistor 48.

Also, the main contact 31 of the trigger switch 30 is connected to the positive power source line through a resistor 58, and a cathode of the diode 56 is connected to the resistor 58 on a side of the main contact 31.

In the main contact 31, connection points with the controller 40 and the resistor 58 are in an opened state when the trigger switch 30 is not operated, while the connection points are grounded to the earth when the trigger switch 30 is operated.

Accordingly, when the trigger switch 30 is operated while the transistor 50 is in an OFF state, electric current flows from the positive power source line through the resistors 46 and 48, and the diode 56 toward the main contact 31. Then, a gate potential of the switching device 44 is lowered, and the switching device 44 is turned to an ON state.

As a result, a battery voltage is supplied to the regulator 42 through the switching device 44, and the regulator 42 starts power supply to the controller 40, resulting in activation of the controller 40.

When the trigger switch 30 is operated, the connection point between the main contact 31 and the controller 40 is grounded to the earth, and a potential at the connection point is lowered. Then, the controller 40, after being activated, detects an operation of the trigger switch 30 based on the potential at the connection point.

The controller 40 outputs a drive signal (high level) to the transistor 50 when the trigger switch 30 is operated, to thereby turn on the transistor 50. Even if operation of the trigger switch 30 is stopped thereafter, the controller 40 continues to output the drive signal to the transistor 50 for a specific time period.

Accordingly, the switching device 44 is turned to an ON state due to the operation of the trigger switch 30, and the ON state continues thereafter until the operation of the trigger switch 30 is stopped for the specific time period. While the switching device 44 is in the ON state, power supply is performed from the regulator 42 to the controller 40.

Figure 2:
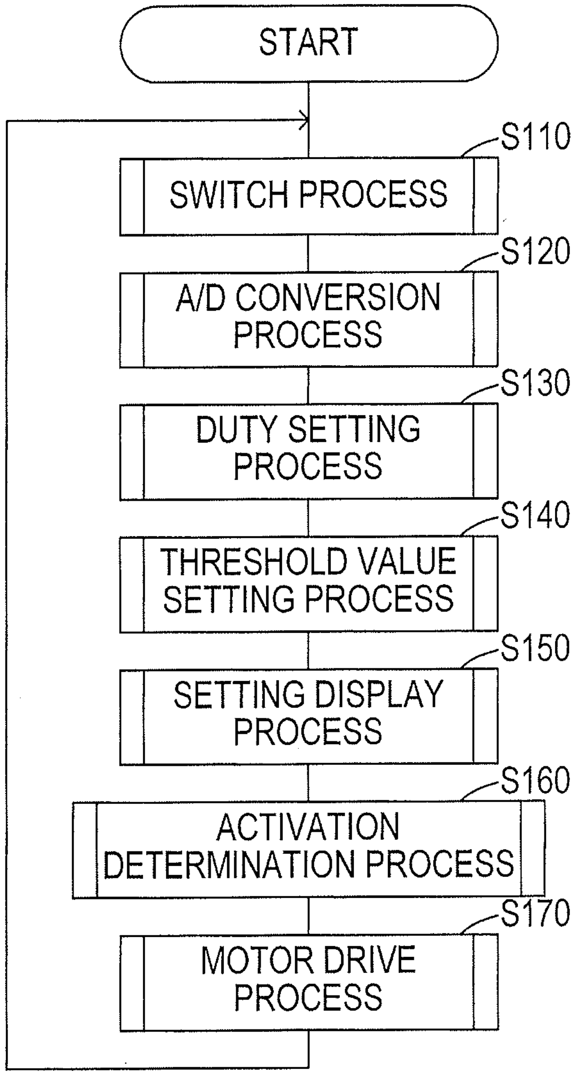
FIG. 2 is a flowchart showing a flow of a control process executed by a controller.

Next, a description will be provided of a control process executed by the controller 40 (more particularly, the CPU) in order to rotary drive the motor 20 in accordance with the drive command from the trigger switch 30, with reference to a flowchart shown in FIG. 2.

The control process is repeatedly executed by the controller 40 while a power-supply voltage Vcc is supplied from the regulator 42 to the controller 40.

As shown in FIG. 2, when starting the control process, the controller 40 first performs a switch process in S110 (S represents "step"). In the switch process, ON/OFF states of the mode selector switch 34, the setting selector switch 38, and the main contact 31 and the forward/reverse contact 33 of the trigger switch 30, are detected.

By performing the switch process as above, the controller 40 recognizes the drive command of the motor 20, a rotation direction switching command, a setting mode switching command, and a setting command of the torque setting value and/or a setting command of the set speed value, and so on, which are inputted through the trigger switch 30, the mode selector switch 34, and the setting selector switch 38.

Then in S120, an A/D conversion process is performed. In the A/D conversion process, a stroke amount of the trigger switch 30 and/or the motor current are/is detected by introducing a resistance value of the sliding resistor 32 of the trigger switch 30 and/or a voltage between both ends of the resistor 26 for detecting the motor current through an A/D converter.

In subsequent S130, a duty setting process is performed. In the duty setting process, the drive duty ratios to perform duty drive of the switching devices Q1-Q6 in the motor drive circuit 24 through the gate circuit 28 are set in accordance with the stroke amount of the trigger switch 30 detected in S120.

In S140, a threshold value setting process is performed. In the threshold value setting process, in a case where it is recognized in the switch process in S110, based on the ON/OFF state of the mode selector switch 34, that the mode for setting the torque setting value is selected, the torque setting value is updated in accordance with the setting command inputted from the setting selector switch 38 and a clutch threshold value corresponding to the torque setting value is set.

The clutch threshold value is a threshold value for determining whether or not the rotational torque of the output shaft rotary driven by the motor 20 has exceeded a rotational torque corresponding to the torque setting value (that is, the upper limit value) using the motor current detected in the A/D conversion process in S120.

Next, in S150, a setting display process is performed. In the setting display process, the clutch threshold value and/or the torque setting value corresponding to the clutch threshold value are/is displayed on a setting display unit 36.

In subsequent S160, an activation determination process is performed. In the activation determination process, it is determined whether or not the rotational torque of the output shaft represented by the motor current detected in S120 has exceeded the rotational torque corresponding to the clutch threshold value set in S140, and thereby it is determined whether or not to stop driving of the motor 20 (in other words, whether or not to cause the function as an electronic clutch to operate).

Then, in S170, a motor drive process is performed. In the motor drive process, a control signal corresponding to the drive duty ratios set in S130 are outputted to the gate circuit 28 to thereby rotary drive the motor 20 through the gate circuit 28 and the motor drive circuit 24. Subsequent to S170, the process proceeds to S110 again.

In the motor drive process, the rotation speed of the motor 20 is detected based on the detection signal from the encoder 22, and drive control of the motor 20 is performed such that the rotation speed will not exceed the set speed value which is set through the mode selector switch 34 and the setting selector switch 38.

Also, in the motor drive process, if the motor current has exceeded the clutch threshold value by the driving of the motor 20 as described above, and activation of the function as an electronic clutch is permitted in the activation determination process of S160, the driving of the motor 20 is stopped.

Accordingly, according to the electric power tool of the present embodiment, it is possible to limit a tightening torque, when tightening an object through the tool bit mounted on the output shaft, to be equal to or less than a rotational torque corresponding to the clutch threshold value. Thus, it is possible to tighten the object with an appropriate tightening torque.

The set speed value to be used to restrict an upper limit of the rotation speed of the motor 20 in the motor drive process is updated by the setting command inputted through the setting selector switch 38, in a case where the setting mode is set to the mode for setting the set speed value through the mode selector switch 34. A detailed explanation of the update operation will be omitted here. The set speed value is stored in the non-volatile memory (see FIG. 1).

Figure 3:
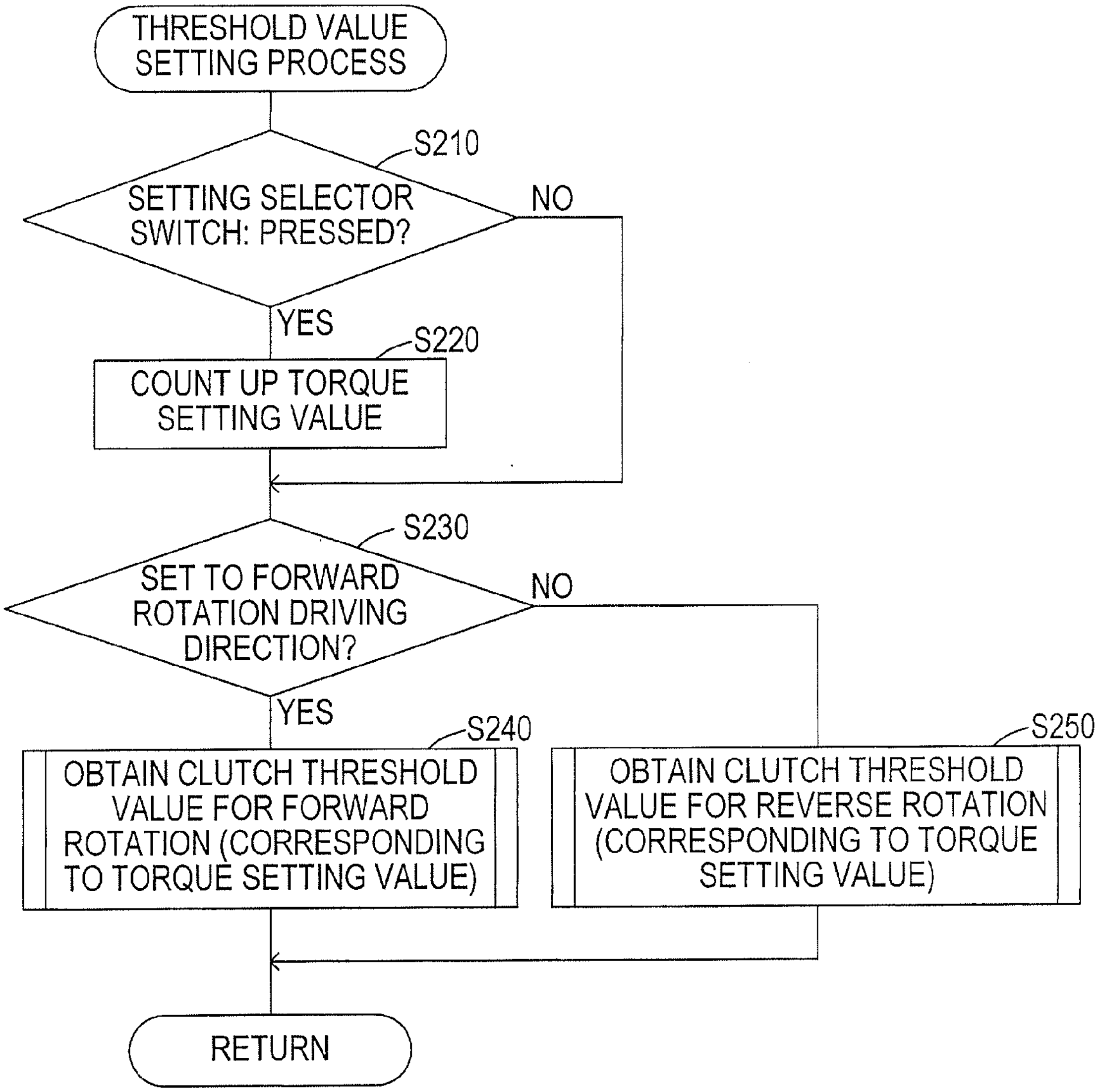
FIG. 3 is a flowchart showing a threshold value setting process.

Next, a description will be provided of the threshold value setting process performed in S140 using the flowchart shown in FIG. 3.

As shown in FIG. 3, in the threshold value setting process, it is first determined in S210 whether or not the setting selector switch 38 has been pressed (in other words, whether or not the aforementioned setting command has been inputted) based on a detection result regarding the ON/OFF state of the setting selector switch 38 in S110.

When it is determined that the setting selector switch 38 has been pressed (S210: YES), the process proceeds to S220, and the torque setting value is counted up by "1". When it is determined in S210 that the setting selector switch 38 has not been pressed (S210: NO), the process simply proceeds to S230.

The torque setting value is a counted value indicating the rotational torque of the output shaft using nine-level values from "1" to "9". In S220, such a process is performed that each time the process is performed, the torque setting value is counted up one by one, and the torque setting value is returned to "1" when the counted value has reached "9".

In S230, it is determined whether or not a driving direction of the motor 20 is currently (at the time of a process in S230) set to a forward rotation driving direction to tighten an object based on a detection result regarding the ON/OFF state of the forward/reverse contact 33 in S110. When it is determined that the driving direction of the motor 20 is set to the forward rotation driving direction (S230: YES), the process proceeds to S240. In S240, a clutch threshold value for a forward rotation of the motor corresponding to a currently set torque setting value is obtained from a threshold value setting map shown in FIG. 4, and is set. Then, the present threshold value setting process is terminated.

On the other hand, when it is determined that the driving direction of the motor 20 is set to a reverse rotation driving direction (S230: NO), the process proceeds to S250. In S250, a clutch threshold value for a reverse rotation of the motor corresponding to the currently torque setting value is obtained from the threshold value setting map shown in FIG. 4, and is set. Then, the present threshold value setting process is terminated.

The threshold value setting map shown in FIG. 4 is a map to be used for setting the clutch threshold value during the forward rotation of the motor or during the reverse rotation of the motor based on the torque setting value updated by the user through the setting selector switch 38. The map is previously stored in a memory (such as a ROM or the like.)

As clearly shown in FIG. 4, the threshold value setting map is set such that the clutch threshold value during the reverse rotation of the motor is larger than the clutch threshold value during the forward rotation of the motor with respect to the same torque setting value.

This is because it is required in some cases to set the rotational torque of the output shaft, when detaching an object by driving the motor 20 in the reverse direction, to a larger value as compared with a value of the tightening torque when tightening the object by driving the motor 20 in the forward direction. Such is required, for example, when impurities are caught by the object.

According to the electric power tool of the present embodiment, as described above, the clutch threshold value during the reverse rotation of the motor 20 is set to be larger than the clutch threshold value during the forward rotation of the motor 20 based on the torque setting value set by the user through the setting selector switch 38, Therefore, according to the electric power tool of the present embodiment, it is possible for the user to rotate the tool bit with an appropriate torque without newly setting the torque setting value (or the clutch threshold value) each time of switching the rotation direction of the motor 20. Thus, an improved usability of the electric power tool can be achieved.

In the present embodiment, the trigger switch 30 corresponds to an example of an operation unit in the present invention, and the controller 40 which performs the control process shown in FIG. 2 corresponds to an example of a torque setting device and an example of a control device in the present invention. A function as the torque setting device is attained by the threshold value setting process to set the clutch threshold value as the upper limit value of the rotational torque of the output shaft.

Although one embodiment of the present invention has been described above, the present invention should not be limited to the above-described embodiment, but may be implemented in various forms within the scope not departing from the gist of the present invention.

Modified Example 1

For example, the threshold value setting process may be configured not only to set the clutch threshold value based on the torque setting value and the rotation direction of the motor 20 but also to stop the function as an electronic clutch immediately after the driving direction of the motor 20 is switched from the forward rotation direction to the reverse rotation direction.

Figure 5:
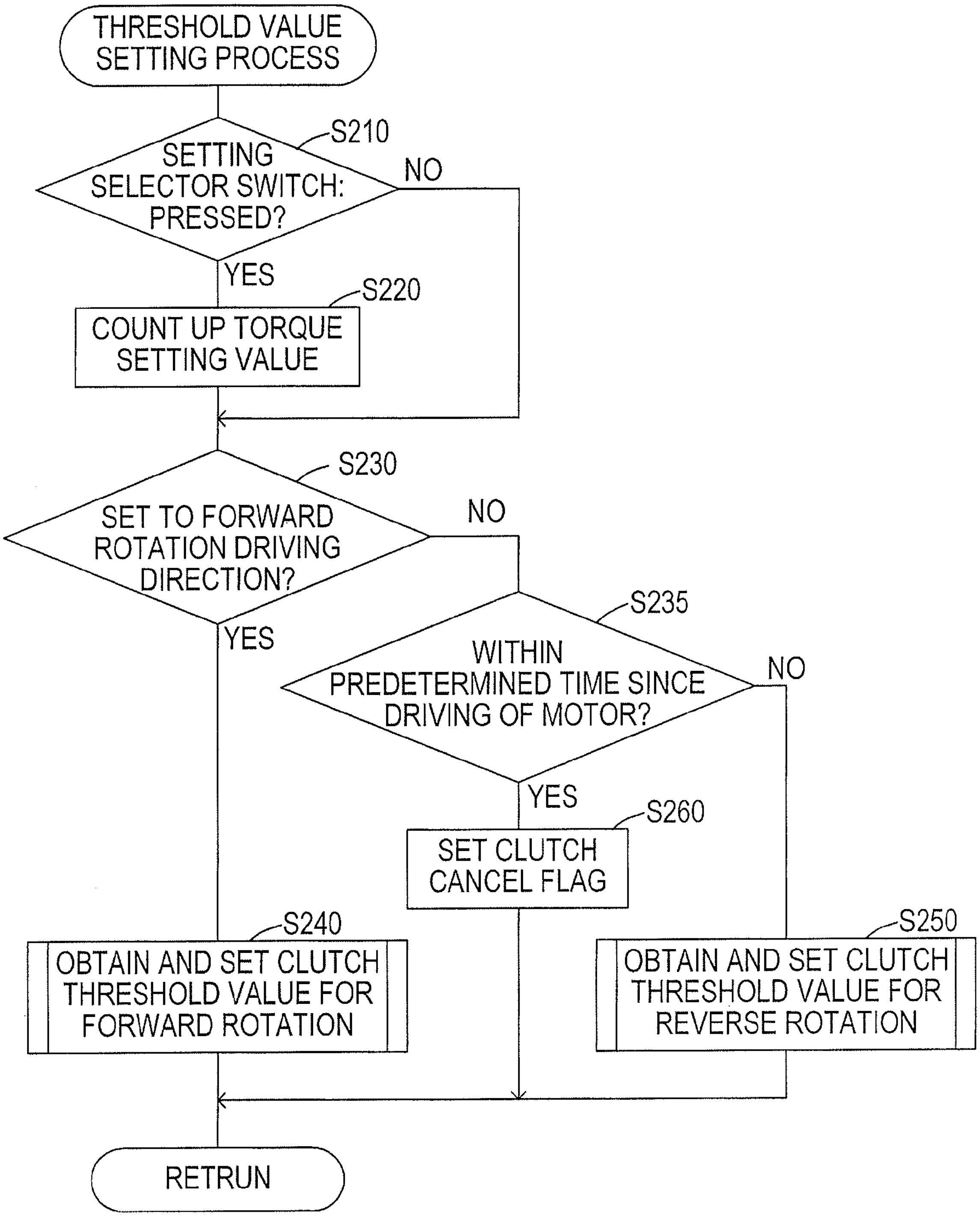
FIG. 5 is a flowchart showing a threshold value setting process of a modified example 1.

Specifically, the controller 40 (more specifically, the CPU) may perform the process shown in FIG. 5. As shown in FIG. 5, when the controller 40 determines in S230 that the driving direction of the motor 20 is not set to the forward rotation driving direction (i.e., set to the reverse rotation driving direction) (S230: NO), the process proceeds to S235. In S235, it is determined whether or not an elapsed time since the previous forward rotation driving of the motor 20 is within a predetermined time.

When it is determined that the elapsed time is not within the predetermined time (S235: NO), the process proceeds to S250. In S250, a clutch threshold value for the reverse rotation of the motor is obtained and set based on the threshold value setting map shown in FIG. 4. When it is determined that the elapsed time is within the predetermined time (S235: YES), the process proceeds to S260. In S260, a clutch cancel flag is set. In S240 and S250, the clutch cancel flag is cleared.

Figure 6:
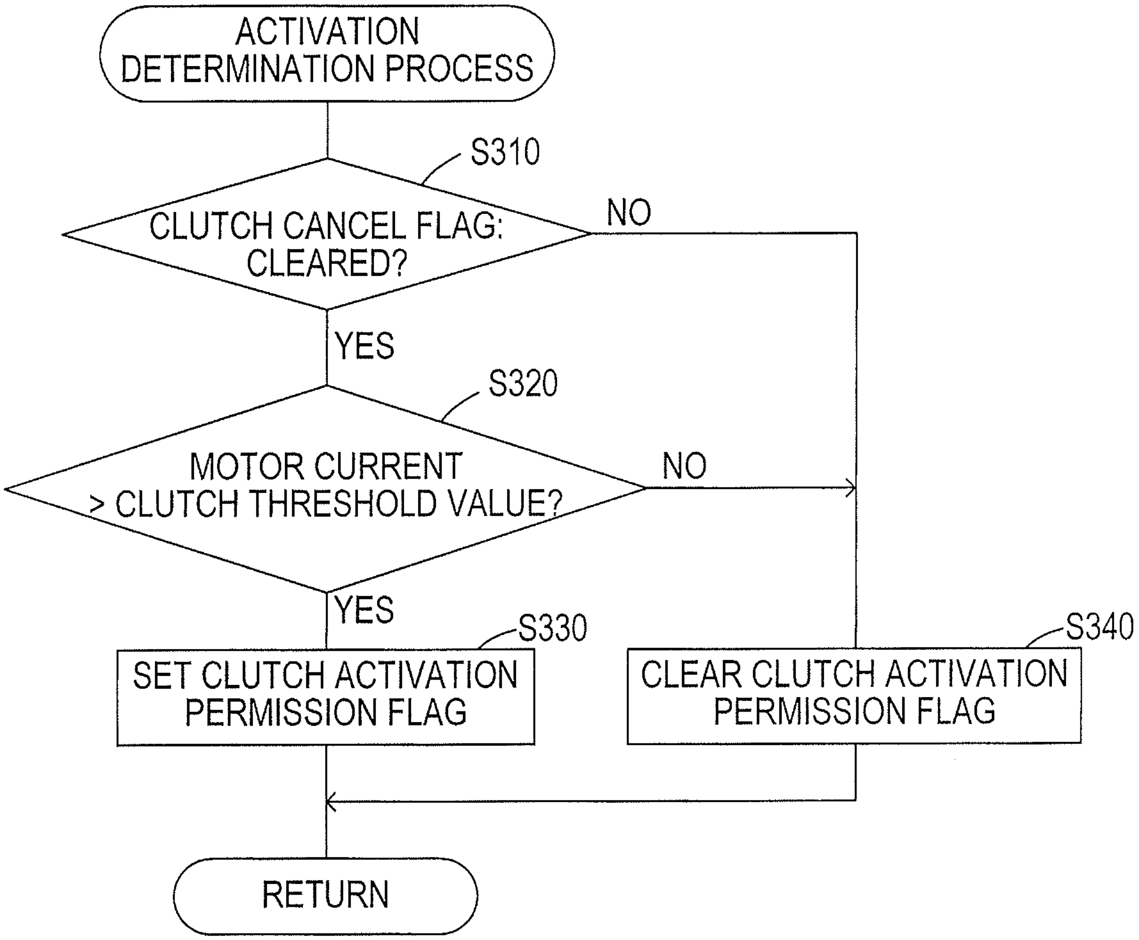
FIG. 6 is a flowchart showing an activation determination process of the modified example 1.

In the activation determination process performed in S160 shown in FIG. 2, it is first determined in S310 whether or not the clutch cancel flag has been cleared, as shown in FIG. 6.

When it is determined that the clutch cancel flag has been cleared (S310: YES), it is then determined whether or not the rotational torque represented by the motor current has exceeded the rotational torque corresponding to the clutch threshold value (S320). When it is determined that the rotational torque represented by the motor current has exceeded the rotational torque corresponding to the clutch threshold value (S320: YES), a clutch activation permission flag is set (S330). As a result of the process in S330 the function as an electronic clutch is activated.

When the clutch cancel flag is set (S310: NO) or the rotational torque represented by the motor current has not exceeded the rotational torque corresponding to the clutch threshold value (S320: NO), the clutch activation permission flag is cleared (S340). As a result of the process in S340 the function as an electronic clutch is stopped.

With the above-described configuration, when the driving direction of the motor 20 is switched to the reverse rotation within the predetermined time since the motor 20 is driven in the forward rotation direction, it is possible to temporarily stop the function as an electronic clutch, to thereby maximize the driving torque of the output shaft in the reverse direction.

Therefore, according to Modified Example 1, in a case of once tightening an object, such as a screw, a bolt, or the like, and thereafter loosening the tightening and removing the object, it is possible to make the driving torque of the tool bit larger, to thereby allow removal of the object in a more favorable manner.

In Modified Example 1, it is described that the function as an electronic clutch is temporarily stopped by setting the clutch cancel flag in S260 in the threshold value setting process in FIG. 6. However, it may be possible to set a maximum value that can be set as the clutch threshold value in S260. With this configuration as well, the function as an electronic clutch may be stopped.

Modified Example 2

While it is described in the aforementioned embodiment that the user sets (updates) control parameters, such as the torque setting value, the set speed value, and the like, by operating the setting selector switch 38, setting of these control parameters may be performed by manually rotating the output shaft on which the tool bit is mounted.

In this case, it is preferable that the control parameters are not to be changed simply due to rotation of the output shaft. Specifically, it is preferable that the control parameters are not changed in a case where the output shaft is rotated due to an intended use (in a case where the output shaft is driven to be rotated by the motor) or in a case where the output shaft is rotated unintentionally for some reason in the OFF state (a non-use state) of the electric power tool.

To achieve the above purpose, the rotation of the output shaft (manual rotation) should be detected only when the trigger switch 30 is operated such that the stroke amount detected by the sliding resistor 32 is substantially zero and only the main contact 31 is turned to the ON state. That is, the rotation of the output shaft should be detected when the output shaft is rotated in a state where the motor is not driven while the electric power tool is in an ON state.

Now, as Modified Example 2 of the aforementioned embodiment, a description will be provided of a threshold value setting process in which the torque setting value is updated by detecting the rotation of the output shaft in the above manner.

Figure 7:
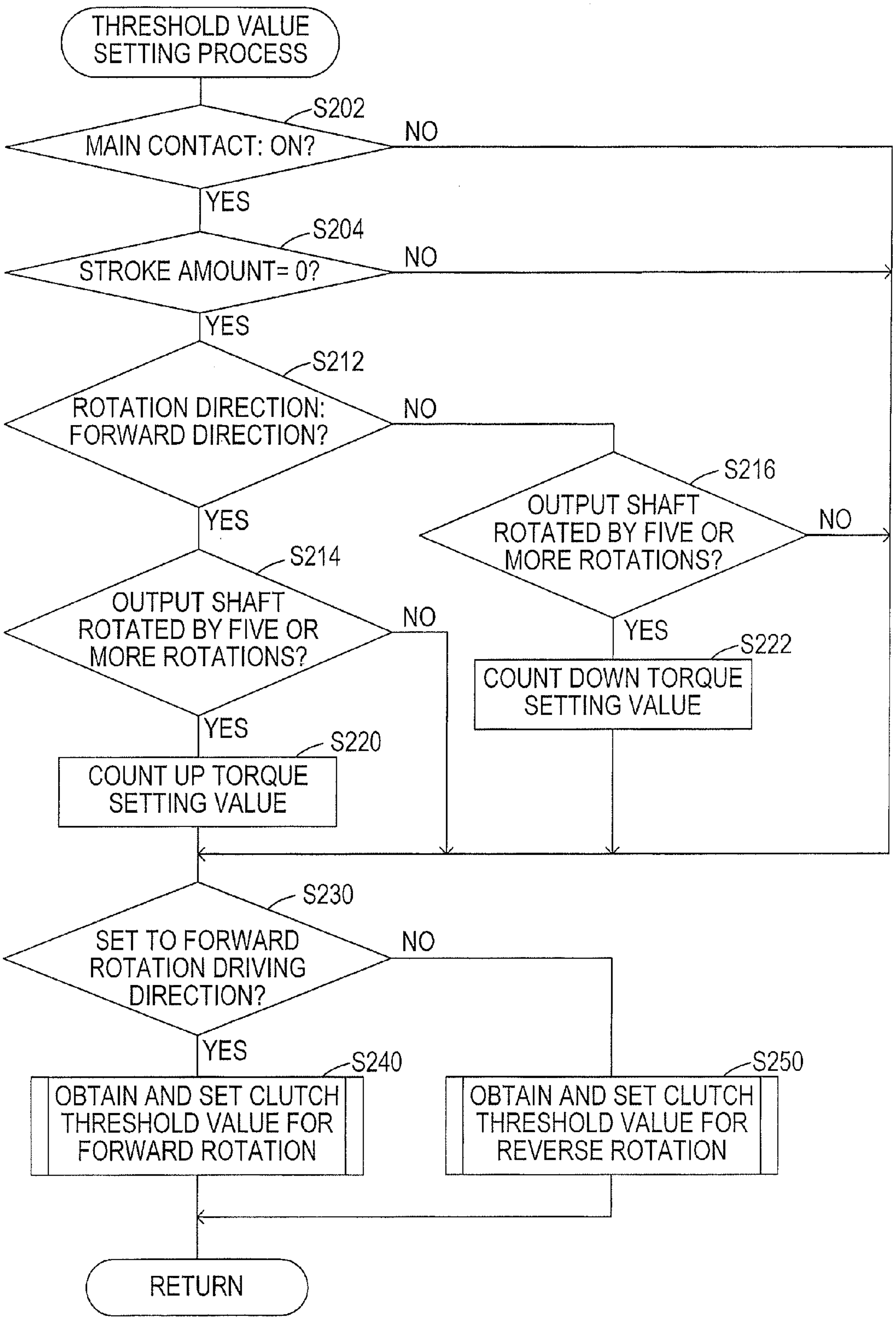
FIG. 7 is a flowchart showing a threshold value setting process of a modified example 2.

As shown in FIG. 7, in the threshold value setting process of Modified Example 2, it is first determined in S202 whether or not the main contact 31 of the trigger switch 30 is in the ON state.

When it is determined that the main contact 31 is in the ON state (S202: YES), it is then determined in S204 whether or not the stroke amount of the trigger switch 30 detected by the sliding resistor 32 is zero (in other words, whether or not the drive command of the motor 20 has been inputted).

When it is determined in S204 that the stroke amount of the trigger switch 30 is zero (S204: YES) (in other words, it is determined that the drive command of the motor 20 has not been inputted), the process proceeds to S212. In S212, it is determined whether or not the output shaft is rotated in the forward direction based on an input pattern of a detection signal (pulse) inputted from the encoder 22. This is intended to determine whether or not the output shaft is manually rotated in the forward direction by the user.

When it is determined in S212 that the output shaft is rotated in the forward direction (S212: YES), the process proceeds to S214. In S214, it is determined whether or not the output shaft has been rotated by five or more rotations.

When it is determined that the output shaft has been rotated by five or more rotations (S214: YES), it is determined that a setting command to increase the torque setting value is inputted, and the process proceeds to S220, in which the torque setting value is counted up by "1".

When the torque setting value is updated in S220, or it is determined in S214 that the output shaft has not been rotated (in the forward direction) by five or more rotations (S214: NO), the process proceeds to S230.

When it is determined in S202 that the main contact 31 is in the OFF state (S202: NO), or it is determined in S204 that the stroke amount is not zero (S204: NO) (in other words, it is determined the drive command of the motor 20 has been inputted), the process also proceeds to S230.

When it is determined in S212 that the output shaft is not rotated in the forward direction (S212: NO), the process proceeds to S216. In other words, when it is determined that the output shaft is rotated in the reverse direction (S212: NO), the process proceeds to S216. In S216, it is determined whether or not the output shaft has been rotated by five or more rotations, and thereby it is determined whether or not the output shaft has been rotated in the reverse direction by five or more rotations.

When it is determined that the output shaft has been rotated in the reverse direction by five or more rotations (S216: YES), it is determined that a setting command to reduce the torque setting value has been inputted, and the process proceeds to S222. In S222, the torque setting value is updated by counting down the torque setting value by "1".

When the torque setting value is updated in S222, or it is determined in S216 that the output shaft has not been rotated in the reverse direction by five or more rotations (S216: NO), the process proceeds to S230.

In S230, in a same manner as in the aforementioned embodiment, it is determined whether or not the driving direction of the motor 20 is set to the forward rotation driving direction. When it is determined that the driving direction of the motor 20 is set to the forward rotation driving direction (S230: YES), the clutch threshold value for the motor forward rotation is obtained and set in S240, and then the present threshold value setting process is terminated.

When the driving direction of the motor 20 is set to the reverse rotation driving direction (S230: NO), the clutch threshold value for the motor reverse rotation is obtained and set in S250, and then the present threshold value setting process is terminated.

By performing the threshold value setting process as described above, it is possible for the user to operate the trigger switch 30 such that only the main contact 31 is turned to the ON state and manually rotate the output shaft, to thereby set (update) the torque setting value.

In this case, since it is not necessary to provide the setting selector switch 38 for setting the torque setting value (in other words, it may be configured such that the manual operation of the output shaft achieves the same function as the operation of the setting selector switch), a simplified configuration can be realized and thus a cost reduction of the electric power tool can be achieved.

Although the torque setting value is counted up or counted down in the case where the output shaft has been rotated (manually rotated) by five or more rotations in aforementioned Modified Example 2, "five rotations" here is merely an example and the number of rotations should not be limited to this specific number.

In the aforementioned embodiment, the setting selector switch 38 is also used for setting the set speed value as the upper limit value of the rotation speed. The process of updating the set speed value may also be configured such that a setting command of the set speed value is determined based on the rotation direction and the number of rotations of the output shaft and then the set speed value is updated, in a same manner as in the aforementioned processes in S202-S222.

Other Modified Examples

Although it has been described in the aforementioned embodiment that the controller 40 is constituted by a microcomputer, the controller 40 may be constituted by, for example, a programmable logic device, such as an ASIC (Application Specific Integrated Circuit) and an FPGA (Field Programmable Gate Array).

The aforementioned control process executed by the controller 40 is achieved by the CPU, which constitutes the controller 40, executing a program. The program may be written in a memory (a ROM or the like) in the controller 40, or may be stored in a recording medium capable of reading data therefrom by the controller 40. As the recording medium, a portable semiconductor memory (such as a USB memory, a Memory Card®, etc.) may be employed.

In the aforementioned embodiment, it is described that the motor 20 is constituted by a three-phase brushless direct current motor. However, any motor may be employed as long as the motor is capable of rotary driving the output shaft on which the tool element is mounted.

Also, in the aforementioned embodiment, such an example is described in which the clutch threshold value during the forward rotation of the motor is larger than the clutch threshold value during the reverse rotation of the motor. However, the clutch threshold value during the forward rotation of the motor may be smaller than the clutch threshold value during the reverse rotation of the motor. For example, the clutch threshold value during the forward rotation of the motor and the clutch threshold value during the reverse rotation of the motor may be set as shown in a threshold value setting map in FIG. 8.

What is claimed is:

1. An electric power tool comprising:

a motor that is configured to rotationally drive an output shaft on which a tool element can be removably mounted;

an operation unit configured to input a drive command of the motor by an external operation;

a torque setting device that sets a forward upper limit value and a reverse upper limit value of a rotational torque of the output shaft in accordance with a torque setting command inputted externally, the forward and reverse upper limit values corresponding to upper limit rotational torque values of the output shaft in respective forward and reverse rotational directions of the output shaft; and a control device that drives the motor in one of a forward direction and a reverse direction in accordance with the drive command from the operation unit, and stops driving of the motor when the rotational torque of the output shaft has reached the forward or reverse upper limit value set by the torque setting device during driving of the motor in respective forward or reverse directions, wherein the torque setting device is configured to set the the forward upper limit value to be different from the reverse upper limit value for a given torque setting.

2. The electric power tool according to claim 1, wherein the motor is configured to tighten an object through the tool element by a rotation in the forward direction and loosen an object through the tool element by a rotation in the reverse direction, and wherein the torque setting device is configured to set the reverse upper limit value larger than the forward upper limit value for a particular torque setting.

3. The electric power tool according to claim 2, wherein the control device inhibits drive stop control of the motor based on the reverse upper limit value set by the torque setting device when the motor is driven in the reverse direction shortly after the motor is driven in the forward direction.

4. The electric power tool according to claim 1, further comprising a speed setting device that sets an upper limit value of a rotation speed of the motor.

5. The electric power tool according to claim 4, configured to be capable of switching between a mode for setting the upper limit value of the rotation speed of the motor by the speed setting device and a mode for setting the forward and reverse upper limit values of the rotational torque of the output shaft by the torque setting device.

6. The electric power tool according to claim 5, further comprising a switching device to switch a mode of the electric power tool between the mode for setting the upper limit value of the rotation speed of the motor by the speed setting device and the mode for setting the forward and reverse upper limit values of the rotational torque of the output shaft by the torque setting device.

7. The electric power tool according to claim 1, further comprising a value setting device that sets one of a plurality of level torque setting values in accordance with the torque setting command, wherein the torque setting device is configured to set the forward and reverse upper limit values of the rotational torque in accordance with the one of the plurality of level torque setting values set by the value setting device.

8. The electric power tool according to claim 7, further comprising a storage device that stores table information in which each set of forward and reverse upper limit values is assigned correspondingly to the each of the plurality of level torque setting values, wherein the torque setting device is configured to refer to the table information and obtain, from the table information, forward and reverse upper limit values corresponding to the one of the plurality of level torque setting values set by the value setting device.

9. The electric power tool according to claim 1, further comprising:

a state determination device that determines an ON or OFF state of the electric power tool;

an input determination device that determines whether or not the drive command of the motor has been inputted; and a rotation determination device that determines, when it is determined by the state determination device that the electric power tool is in the ON state and it is also determined by the input determination device that the drive command has not been inputted, whether or not the output shaft has been rotated a predetermined number or more of rotations, wherein the torque setting device is configured to set the forward and reverse upper limit values of the rotational torque of the output shaft when it is determined by the rotation determination device that the output shaft has been rotated the predetermined number or more of rotations.

10. The electric power tool according to claim 9, wherein the rotation determination device is configured to determine whether or not the output shaft has been rotated the predetermined number or more of rotations in which of the forward rotation direction and the reverse rotation direction, wherein the electric power tool includes a value setting device that sets one of a plurality of level torque setting values, the value setting device updating the one of the plurality of level torque setting values when it is determined by the rotation determination device that the output shaft has been rotated the predetermined number or more of rotations in one of the forward rotation direction and the reverse rotation direction, and wherein the torque setting device is configured to set the forward and reverse upper limit values of the rotational torque in accordance with the one of the plurality of level torque setting values set by the value setting device.

11. An electric power tool comprising:

a motor that rotary drives an output shaft on which a tool element is mounted;

an operation unit to input a drive command of the motor by an external operation;

a torque setting device that sets an upper limit value of a rotational torque of the output shaft in accordance with a torque setting command inputted externally; and a control device that drives the motor in one of a forward direction and a reverse direction in accordance with the drive command from the operation unit, and stops driving of the motor when the rotational torque of the output shaft has reached the upper limit value set by the torque setting device during driving of the motor, wherein the torque setting device is configured to set the upper limit value such that the upper limit value during driving of the motor in the forward direction and the upper limit value during driving of the motor in the reverse direction are different.

* * * * *